March 1, 1966 F. R. CHARVAT 3,237,359
SPALL RESISTANT REFRACTORY BRICK
Filed May 18, 1962 2 Sheets-Sheet 1
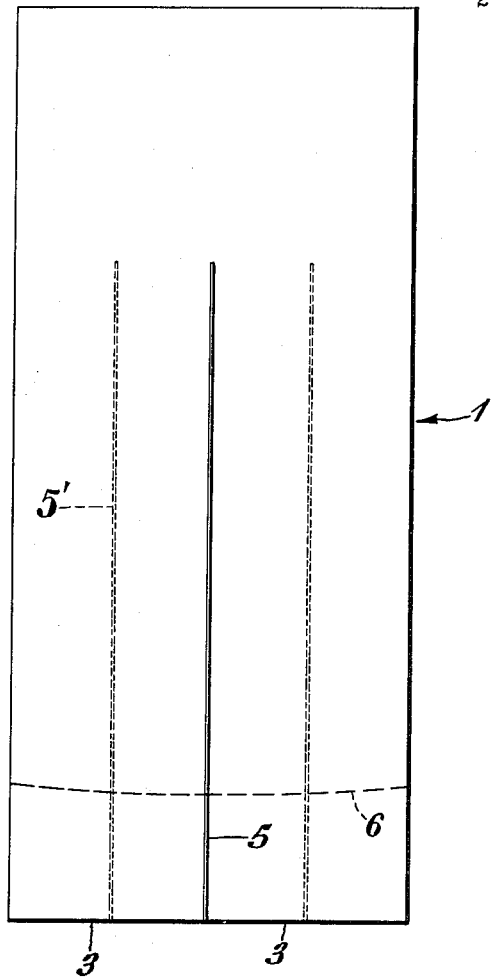
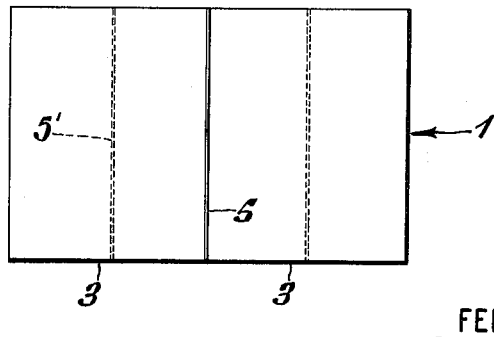
INVENTOR.
FEDIA R. CHARVAT
ATTORNEY March 1, 1966 F. R. CHARVAT 3,237,359
SPALL RESISTANT REFRACTORY BRICK
Filed May 18, 1962 2 Sheets-Sheet 2
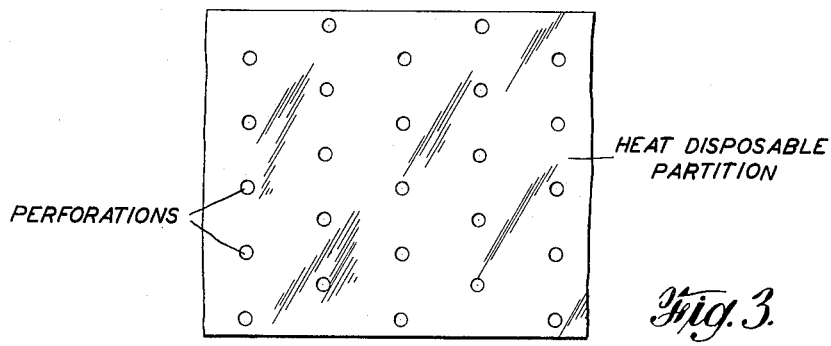
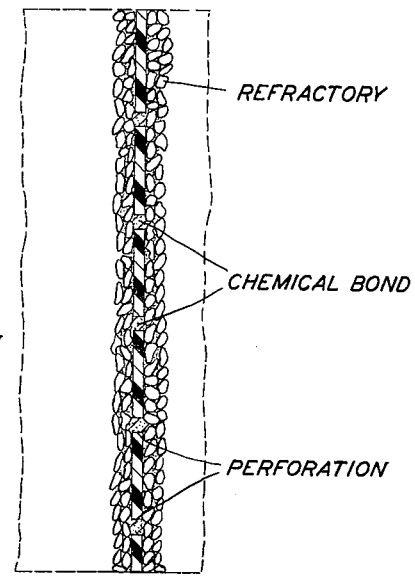
INVENTOR.
FEDIA R. CHARVAT
ATTORNEY

United States Patent Office 3,237,359
Patented Mar. 1, 1966

3,237,359
SPALL RESISTANT REFRACTORY BRICK
Fedia R. Charvat, Williamsville, N.Y., assignor to Union Carbide Corporation, a corporation of New York
Filed May 18, 1962, Ser. No. 195,704
6 Claims. (Cl. 52—232)

The present invention relates to a refractory brick and like article having superior resistance to spalling when used in furnace construction.

In the construction of furnaces used at very high temperatures it is a common practice to employ bricks which have been formed by pressing particles of refractory material to the desired shape.

Bricks of this type, while being satisfactory in many respects, tend, after extended use, to break and spall away along a plane generally parallel to the hot face of the brick. This phenomena, which is due in large part to cyclic and intermittent furnace operation, results in premature failure of the furnace.

The aforementioned spalling problem is of long standing and numerous efforts have been made to find a solution.

A particular effort in this regard involves the embedding of metallic spacers in refractory bricks as disclosed in U.S. Patent 2,652,793 to Heuer et al. In this patent, it is disclosed that the spall resistance of a molded refractory brick could be improved through the use of oxidizable metal spacers extending part way from the hot face of the brick. In operation, the metal spacer, e.g., steel, oxidizes and reacts with the brick material to form a monolithic structure.

It has been found that it is not always desirable to increase the metal oxide content of a refractory brick in this manner since disruptive forces are generated by the oxides, interior the brick, particularly during cyclic furnace operation. Moreover, the use of metallic spacers significantly increases the cost of the bricks.

It is therefore an object of the present invention to provide a spall-resistant refractory brick in a manner which is inexpensive and which does not introduce harmful impurities into the brick.

Other objects will be apparent from the following description and claims taken in conjunction with the drawing in which:

FIGURE 1 shows somewhat schematically a top view of a refractory brick in accordance with the present invention, FIGURE 2 shows an elevation view of the brick of FIGURE 1, FIGURE 3 shows a fragmented side elevation view of a partition suitable for use with chemically bonded bricks in accordance with the present invention, and FIGURE 4 shows an elevation view in section of a chemically bonded brick having a partition of the type shown in FIGURE 3.

A furnace brick in accordance with the present invention comprises a refractory mass having a partition extending from its intended hot face part way along its length. The partition of the brick of the present invention is fugitive and disposable by heating.

A refractory brick in accordance with the present invention is shown in FIGURES 1 and 2.

In the drawing a pressed brick 1 is indicated as having a hot face 3 and is shown to have a partition 5 which completely divides a portion of the brick and which is formed of a heat disposable material such as cardboard. In the preferred form, as shown in the drawing, the partition extends about three quarters of the length of the brick in a place perpendicular to the hot face. The length of the partition is not critical and the partition can extend from the hot face to within about 1 inch or less from the end of brick so long as the final product has sufficient strength for its intended use. With bricks manufactured in this form, a very high resistance to spalling is achieved. In bricks manufactured without partitions, spalling generally occurs in the vicinity of the dotted line 6 shown in the drawing.

In the practice of the present invention, a mix of refractory material is prepared and pressed to the desired shape in accordance with the usual techniques. The mix can contain a binder which may be organic such as pitch or a chemical binder such as magnesium sulfate, magnesium chloride and the like. Other suitable binders can also be used.

At the time of pressing, one or more non-metallic partitions are installed in the brick extending from and substantially perpendicular to what is to be the hot face of the brick. While most often the partitions employed are straight and extend parallel to the edge of the brick, it is at times advantageous to use partitions which are pleated or have an undulating surface.

In accordance with this invention, the partition is formed of material which is heat disposable and substantially non-reactive with the brick mix materials so that upon heating of the brick, either prior to or during use, the partition combusts or otherwise decomposes and is eliminated from the brick. That is to say, the partition in the brick of this invention is a fugitive partition. Materals which are suitable for use as partitions in this invention are paper, cardboard, cloth, plastic, wood and the like.

When a brick of the type aforedescribed is heated to a temperature at which the partition is removed, an article is provided which has a discontinuous structure and which is seen to have a crack in the place where the partition was previously located. It has been found that bricks in this form are remarkably resistant to spalling, although the reason for this benefit is not completely understood.

The following example is provided to further illustrate the present invention.

*Example I*

Two separate bricks, 9 inches x 4½ inches x 2½ inches, were formed by pressing particles of a fused chrome ore-magnesia mixture (62 percent MgO). The bricks formed in a steel die at a pressure of 10,000 p.s.i. In one of the bricks, a partition was provided in the manner shown in the drawing with the partition extending to the intended hot face of the brick. The partition was a $\frac{1}{32}$ inch thick strip of cardboard 7 inches x 2½ inches which was inserted in the die before pressing. The other brick had no partition.

Both bricks were fired in the usual manner at a temperature of about 1600° C. for 3 hours. During this treatment the cardboard combusted and was eliminated from the partitioned brick resulting in a discontinuity in the brick, resembling a crack, which extended about three quarters of the length of the brick.

Both bricks were then inserted next to each other in a furnace wall and thermally cycled thirty times between 1700° C. and 1400° C.

After this test the bricks were examined. The brick manufactured without a partition showed a crack behind and parallel to its hot face. The brick manufactured with the partition showed no signs of cracking.

The test was repeated with two additional bricks and the results were the same.

In the present invention, the brick can be formed of any of the usual refractory materials used for furnace bricks such as magnesia, chrome ore, chrome-magnesite and magnesite-chrome. That is to say, the brick material is not critical in this invention.

Also, the manner of forming the bricks is not critical in that the usual pressing techniques can be used and either organic or chemical binders can be used as desired.

When using organic binders, the pressed brick is usually fired or burned before use and during this treatment the partition in the brick is removed.

With chemically bonded bricks, which are generally installed in furnaces without previous high temperature heating, the partition is removed by heat during furnace operation as a consequence of exposure to high temperatures.

In either event, the resulting brick has a structure which is discontinuous at the place where the partition was located and as a consequence has superior resistance to spalling.

In a further embodiment of the present invention one or more heat disposable partitions which extend the entire length of the bricks are used with chemically bonded bricks. In this embodiment, as illustrated in FIGURES 4 and 5, the partition employed is provided with a sufficient number of perforations or similar openings so that the chemical bonding agent can impart enough strength to the bricks for handling and installation.

With bricks of this embodiment, when the partition is removed by heat, a practically complete discontinuity exists through the brick which is interrupted only by bridges of bonding materials at places where the perforations were located. Since some of these bridges of bonding material are destroyed during the firing which removes the partition, the discontinuity in the brick is practically total.

It is to be understood that in the practice of the present invention, perforated partitions which do not extend the entire length of the brick can be used with advantage in many instances, particularly where somewhat higher brick strength is needed during handling and installation.

From the foregoing description it can be seen that the present invention is of considerable industrial benefit by providing highly spall-resistant brick which is not contaminated by the method of manufacture and which can be made without any significant increase in expense.

What is claimed is:

1. A refractory brick having improved resistance to hot face spalling which comprises a bonded mass of refractory particles and a non-metallic, heat disposable partition compressed within said bonded mass, said bonded mass being of substantially rectangular cross-section and having side faces substantially longer than its end faces, said heat disposable partition extending from the intended hot end face of said refractory mass substantially parallel to a side face thereof at least ¾ of the length of the refractory mass and to at least within one inch to the opposite end face of said refractory mass.

2. A refractory brick in accordance with claim 1 wherein said heat disposable partition is formed of paper.

3. A refractory brick in accordance with claim 1 wherein said heat disposable partition is formed of cardboard.

4. A refractory brick in accordance with claim 1 wherein said heat disposable partition is formed of wood.

5. A refractory brick in accordance with claim 1 wherein said heat disposable partition is formed of cloth.

6. A refractory brick in accordance with claim 1 wherein said heat disposable partition is formed of plastic.

References Cited by the Examiner

UNITED STATES PATENTS

| | | | |
|---|---|---|---|
| 1,252,415 | 1/1918 | Duckham | 52—232 |
| 2,296,392 | 9/1942 | Marchant | 52—443 |
| 2,652,793 | 9/1953 | Heuer et al. | 52—596 X |

FOREIGN PATENTS

| | | |
|---|---|---|
| 638,767 | 6/1950 | Great Britain. |
| 735,068 | 8/1955 | Great Britain. |
| 809,976 | 3/1959 | Great Britain. |

RICHARD W. COOKE, JR., *Primary Examiner.*

EARL J. WITMER, JACOB L. NACKENOFF,
*Examiners.*